Feb. 20, 1962  W. A. MULHERN  3,022,112
WHEEL COVER
Filed Feb. 15, 1960
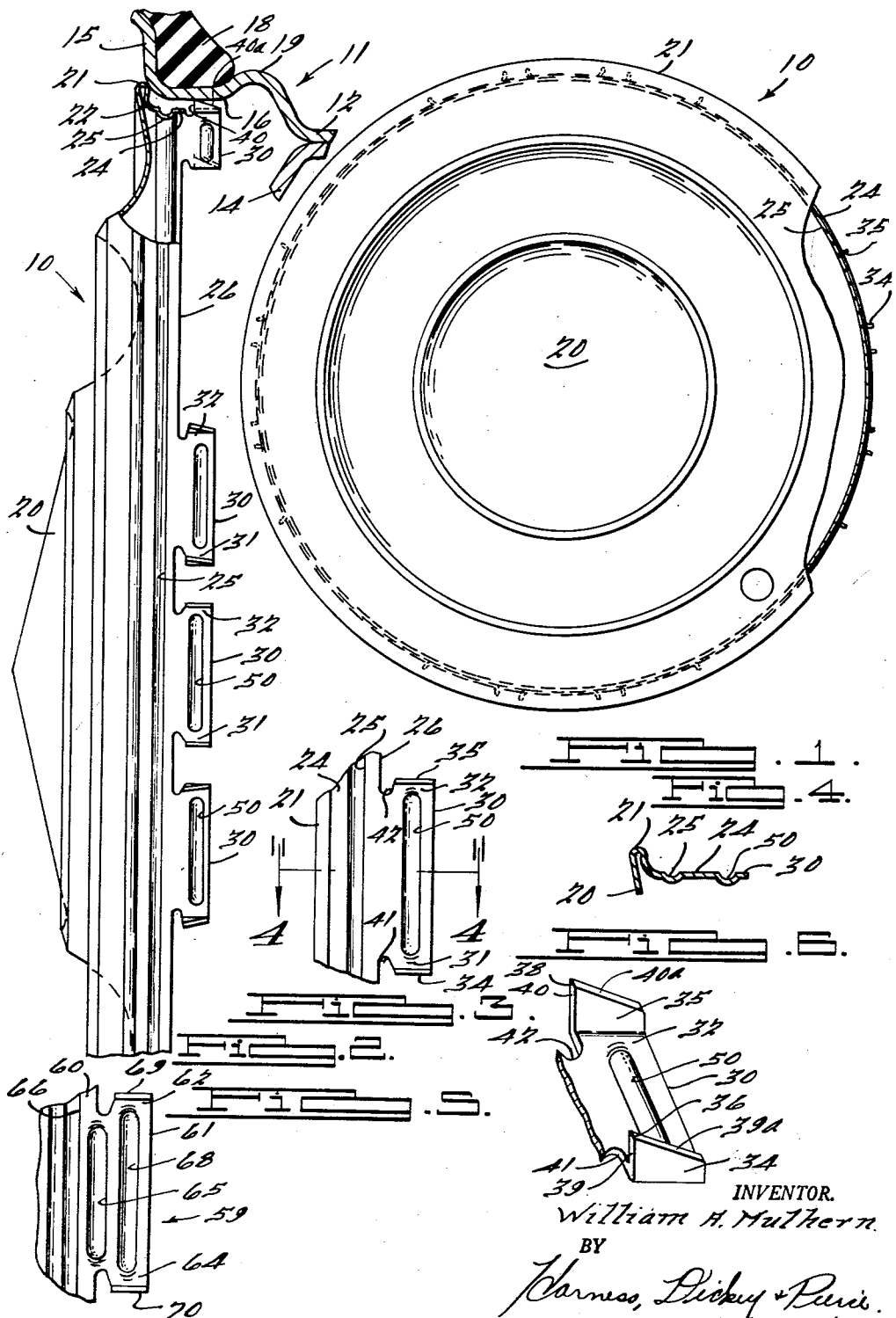
INVENTOR.
William A. Mulhern
BY
Harness, Dickey & Pierce
ATTORNEYS United States Patent Office 3,022,112
Patented Feb. 20, 1962

3,022,112
WHEEL COVER
William A. Mulhern, Detroit, Mich., assignor to Gar Wood Industries, Inc., Wayne, Mich., a corporation of Michigan
Filed Feb. 15, 1960, Ser. No. 8,583
2 Claims. (Cl. 301—37)

This invention relates generally to an ornamental and protective cover for a wheel of a motor vehicle, and more particularly to an improved means for retaining such a wheel cover on a wheel of a motor vehicle.

An ornamental cover for a wheel of a motor vehicle is required to be positively engageable with the wheel, yet be readily removable therefrom to provide access to the outer frontal face of the wheel. Such a wheel cover is required to be usable on a wheel having a safety rim, cover retaining embossments, or other particular structural characteristics, without necessitating modification of either the wheel cover or the wheel structure to effect proper engagement therebetween. Further, such a wheel cover should be relatively inexpensive and easy to manufacture, and in order to function as an ornament for the vehicle wheel, should be aesthetically pleasing. This latter requirement is subjective and not readily adapted to analytical solution. However, the remaining of the aforementioned requirements present objective problems to which the present invention offers a novel solution.

The present invention is directed to a novel retaining structure for a wheel cover that substantially overcomes many of the problems heretofore associated with retaining a wheel cover on a wheel of a motor vehicle. A wheel cover made in accordance with the teaching of the present invention is relatively easy and inexpensive to manufacture because it can be fabricated from a single blank of relatively thin and soft material, for example stainless steel sheet material .020 inch thick. Because of the novel configuration and orientation of the retaining means such a wheel cover is positively engageable with the wheel of a vehicle, yet is relatively resilient and impervious to fatigue.

Accordingly, one object of the present invention is an improved wheel cover.

Another object is an improved retaining means for a wheel cover.

Another object is a wheel cover having a plurality of independently flexible retaining arms and fingers, each of the fingers having a biting tooth at an outer extremity.

Another object is a wheel cover having a plurality of retaining arms and fingers that are independently flexible about angularly related axes.

Another object is a wheel cover wherein no portion of the retaining means is overstressed upon engagement or disengagement with a vehicle wheel.

Other objects and advantages of the present invention will become apparent from the following description wherein reference is made to the drawings, in which:

FIGURE 1 is a front elevational view of a wheel cover in accordance with an exemplary embodiment of the present invention, partially broken away for clarity;

FIG. 2 is a fragmentary side elevational view of the wheel cover of FIG. 1, enlarged for clarity, and shown in association with a wheel of a motor vehicle;

FIG. 3 is an enlarged fragmentary view of a retaining arm;

FIG. 4 is a cross-sectional view taken substantially along the line 4—4 of FIG. 3;

FIG. 5 is a fragmentary view of a modified retaining arm;

FIG. 6 is a fragmentary perspective view of the retain-arm of FIG. 3.

Referring to the drawings, a wheel cover 10, in accordance with an exemplary embodiment of the present invention, is shown in operative association with a vehicle wheel 11. The wheel 11 has a drop center rim 12 that is rigidly secured to a load bearing spider 14 by any suitable means. The wheel 11 has a radially outwardly extending terminal flange 15 and an intermediate axially extending flange 16 that cooperate to locate and support a pneumatic tire 18. The intermediate axial flange 16 may also include a safety rib 19 on the opposite side thereof from the terminal flange 15.

The wheel cover 10 comprises a face or body portion 20 having an outer peripheral edge 21, is radially inwardly folded portion 22, and an axially extending retainer flange 24. The retainer flange 24 is of smaller diameter than the intermediate flange 16 on the wheel 11 so as to be telescopically receivable therein in closely spaced relationship. The peripheral edge 21 of the wheel cover extending diametrically beyond the axial flange 16 on the wheel 11 so as to engage the terminal flange 15 to locate the wheel cover 10 axially with respect to the wheel 11.

The retainer flange 24 is integral with the body portion 20 of the wheel cover 10, therefore the material thereof, for example .020 inch thick stainless steel, is the same as the material used for the body portion 20 of the wheel cover 10.

The retainer flange 24 is preferably cold worked to improve the physical characteristics of the material thereof as by the impression of a continuous circumferentially extending embossment 25 thereon intermediate the re-entrantly folded portion 22 and a rearward edge 26 on the flange 24. Such cold working of flange 24 aids the flange 24 in stiffening the wheel cover 10 against both radial deformation and twisting about a transverse axis.

A plurality of cantilevered retaining arms 30 extend rearwardly from the retaining flange 24, with respect to the rearward edge 26 thereof, at spaced intervals, for example, in groups of three at four equally spaced apart locations along the flange 24. Because the retaining arms 30 are identical in construction, only one will be described hereinafter.

In accordance with one embodiment of the present invention, each retaining arm 30 is provided with a pair of oppositely and circumferentially directed cantilevered retainer fingers 31 and 32, having radially outwardly extending teeth 34 and 35, respectively, at the terminal ends thereof. The teeth 34 and 35 have sharpened points 36 and 38 respectively, defined by the juncture of a pair of radially outwardly extending edge faces 39 and 40 with a pair of radially and axially inwardly extending edge faces 39a and 40a, respectively. It is to be noted that the teeth 34 and 25 extend radially outwardly in planes including the central axis of the wheel cover, respectively. Therefore, because of the novel configuration and orientation of the arm 30 and fingers 31 and 32 as will be discussed, the teeth 34 and 35 are subjected to only radial loads which are relatively easily accommodated without deformation of the tooth configuration.

The retainer fingers 31 and 32 are isolated from the retainer flange 24 by a pair of cutouts 41 and 42 at opposite sides of the retainer arm 30. Accordingly, each cantilevered retainer arm 30 is bendable about an axis that extends generally tangential to the flange 24 and normally to the central axis of the wheel cover 10 between the cutouts 41 and 42. The retainer fingers 31 and 32 are bendable with respect to the retainer arm 30 about axes extending from the cutouts 41 and 42, respectively, rearwardly generally parallel to the central axis of the wheel cover 10. Flexure of the arm 30, and of each of the fingers 31 and 32 with respect to its associated arm 30, with respect to the flange 24 about the aforementioned axis, is independent of flexure of any other arm 30 or its fingers 31 and 32.

It is to be noted that the points 36 and 38 on the teeth 34 and 35, respectively, are spaced axially rearwardly from the axis of bending of the cantilevered arm 30, as defined by the axial width of the cutouts 41 and 42. Also, the points 36 and 38 on the teeth 34 and 35, respectively, are spaced circumferentially from the axes of bending of the fingers 31 and 32, as defined by the circumferential depth of the cutouts 41 and 42. This spacing of the teeth 34 and 35 subjects the arm 30 and fingers 31 and 32 to a finite bending moment the magnitude of which is controlled to prevent high stresses, as will be described.

In the unsprung condition, the points 36 and 38 on the teeth 34 and 35, respectively, extend radially outwardly to a larger diameter than the inside diameter of the intermediate flange 16 on the wheel 11. Therefore, when the cover 10 is applied to the wheel 11, the teeth 34 and 35 on the retainer fingers 31 and 32, respectively, are biased radially inwardly relative to the flange 24, thus subjecting the arm 30 and the fingers 31 and 32 to bending moments. By controlling the bending moments on the fingers 31 and 32 and arm 30, by the ratio of depth to width of the cutouts 41 and 42, the teeth 34 and 35 are resiliently urged into engagement with the intermediate flange 16 on the wheel 11 independently of each other without overstressing either the fingers 31 and 32 or the arm 30. Such a distribution of the bending stress in the fingers 31 and 32 and arm 30 reduces the possibility of fatigue and permanent deformation thereof to a minimum.

Removal of wheel covers heretofore known and used often results in deformation and reorientation of the biting teeth, which, upon re-installation, do not positively re-engage the vehicle wheel. The cantilevered mounting of the arm 30, coupled with the orientation of the teeth 34 and 35 in planes generally normal to the frontal plane of the wheel cover 10 and including the central axis of the wheel cover 10, as taught by the present invention, is particularly important in solving this problem in that it facilitates removal of the cover 10 from the wheel 12 of a vehicle without deformation of the teeth 34 and 35 or overstressing the fingers 31 and 32.

Because the points 36 and 38 of the teeth 34 and 35, respectively, tend to imbed themselves in the flange 16 of the wheel 11, the problem of disengagement of the teeth 34 and 35 in a manner that precludes deformation thereof is rendered relatively difficult. However, as discussed hereinbefore, the teeth 34 and 35 are folded radially outwardly in radial planes including the central axis of the wheel cover and therefore present a maximum resistance to deformation in such planes. Therefore, removal is accomplished by providing for radial movement of the teeth 34 and 35 by flexure of the arm 30 about its axis of bending to disengage the imbedded points 36 and 38 from the wheel flange 16 with subsequent axial movement of the teeth 34 and 35, both of the aforesaid movements being in the direction of maximum strength of the teeth 34 and 35, namely, in their own planes. Such flexure of the arm 30 provides for disengagement of the teeth 34 and 35 without permanent deformation.

The retainer arm 30 is preferably work hardened by the impression of an embossment 50 therein that extends circumferentially across the arm 30 between the teeth 34 and 35 on the fingers 31 and 32. Impression of the embossment 50 in the arm 30 increases the elastic limit thereof so as to reduce the possibility of permanent deformation upon engagement and disengagement of the cover 10 from the wheel 11. Thus, the cover 10 may be fabricated from relatively thin soft stock without fear that the elastic limit thereof will be exceeded upon normal flexure of the arms 30 and fingers 34 and 35.

The aforementioned combination of a relatively stiff axially extending retaining flange 24 with an axially extending retainer arm 30 that is bendable about an axis tangential of the flange 24 and has circumferentially extending resilient fingers 31 and 32 thereon that are bendable about axes parallel to the central axis of the wheel cover 10 maximizes the holding power of the cover 10 upon the wheel 11.

Referring to FIG. 5, a modified retaining assembly 59 comprises a retainer flange 60 having an axially extending retainer arm 61 thereon that is provided with a pair of circumferentially extending retainer fingers 62 and 64. An intermediate embossment 65 is disposed between a continuous circumferentially extending embossment 66 on the flange 60 and an embossment 68 that extends between a pair of radially outwardly directed teeth 69 and 70 on the fingers 62 and 64, respectively. The teeth 69 and 70 are pointed as discussed hereinbefore, to effect biting engagement with the wheel flange 16. Addition of the intermediate embossment 65 additionally work hardens the retainer arm 61 to increase its resistance to permanent deformation upon deflection about an axis tangential to the flange 60 and normal to the central longitudinal axis of the wheel cover 10.

While two structural embodiments of the present invention have been illustrated it will be apparent to those skilled in the art that, with reference to FIG. 5, any one or two of the three embossments 65, 66 and 68 may be omitted. In addition where wheel design and other conditions make it desirable, the length of the arms 30 may be such that the teeth engage partially within the safety rib groove.

From the foregoing description it should be apparent that a wheel cover in accordance with the teaching of the present invention is relatively easy to manufacture from a single piece of thin and soft material. The configuration of the axially extending arms and circumferentially extending fingers coupled with the cold working thereof results in a wheel cover that is relatively impervious to fatigue, positively engageable with a vehicle wheel, yet removable therefrom without overstressing the retaining structure.

While it will be apparent that the embodiments of the invention herein disclosed are well calculated to fulfill the objects of the invention it will be appreciated that the invention is susceptible to modification, variation and change without departing from the proper scope or fair meaning of the subjoined claims.

What is claimed is:

1. A wheel cover for disposition on the outer frontal face of a vehicle wheel, said wheel cover comprising a circular body portion having an annular flange extending axially rearwardly therefrom, a plurality of cantilevered arms extending axially rearwardly from said flange, said arms including a pair of cantilevered finger portions extending circumferentially and oppositely therefrom, respectively, each of said fingers having a tooth at the circumferential terminal end thereof folded radially outwardly about an axis extending generally parallel to the central axis of said body portion so that each tooth lies in a plane perpendicular to the plane of the cover, each of said teeth having a point spaced axially rearwardly from said flange and circumferentially from the base of the finger portion of the associated arm for biting engagement with the vehicle wheel, engagement of said teeth with the vehicle wheel effecting radial flexure of said arms and finger portions, respectively, disengagement of said teeth from the vehicle wheel being accommodated by radial flexure of said arms, respectively, and movement of said teeth in their own plane.

2. A wheel cover in accordance with claim 1 having a rib extending circumferentially of said arm between said fingers.

References Cited in the file of this patent

UNITED STATES PATENTS

| | | |
|---|---|---|
| 2,772,924 | Landell | Dec. 4, 1956 |
| 2,815,986 | Landell | Dec. 10, 1957 |
| 2,902,387 | Lyon | Sept. 1, 1959 |
| 2,920,921 | Lyon | Jan. 12, 1960 |

UNITED STATES PATENT OFFICE
CERTIFICATE OF CORRECTION

Patent No. 3,022,112                                  February 20, 1962

William A. Mulhern

It is hereby certified that error appears in the above numbered patent requiring correction and that the said Letters Patent should read as corrected below.

Column 2, line 15, for "is" read -- a --; line 21, for "extending" read -- extends --; line 59, for "25" read -- 35 --; line 66, for "The retainer fingers 31 and 32" read -- The retainer arm 30 and retainer fingers 31 and 32 --.

Signed and sealed this 20th day of November 1962.

(SEAL)
Attest:

ERNEST W. SWIDER                                      DAVID L. LADD
Attesting Officer                                          Commissioner of Patents